(No Model.) 3 Sheets—Sheet 1.

W. H. FITZ GERALD.
MANUFACTURE OF CROWNS FOR WATCH CASES.

No. 353,931. Patented Dec. 7, 1886.

Witnesses:
Jas. E. Hutchinson.
Henry C. Hazard.

Inventor:
W. H. Fitz Gerald, by
Prindle and Russell, his attys (No Model.) 3 Sheets—Sheet 2.
W. H. FITZ GERALD.
MANUFACTURE OF CROWNS FOR WATCH CASES.
No. 353,931. Patented Dec. 7, 1886.
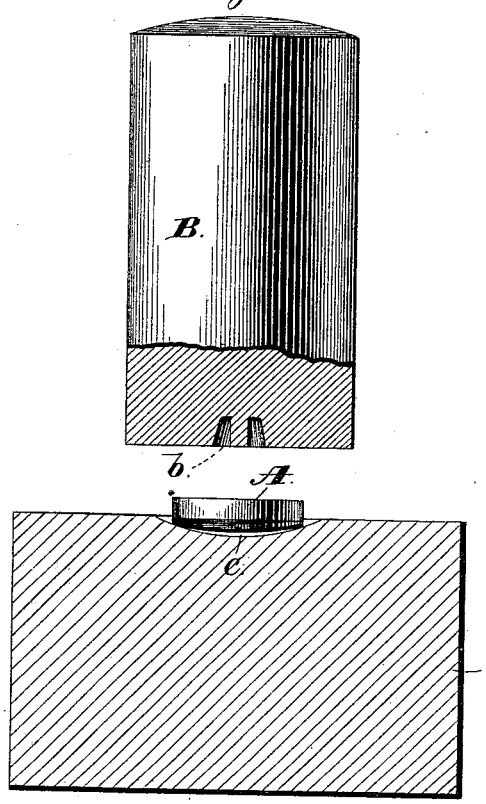
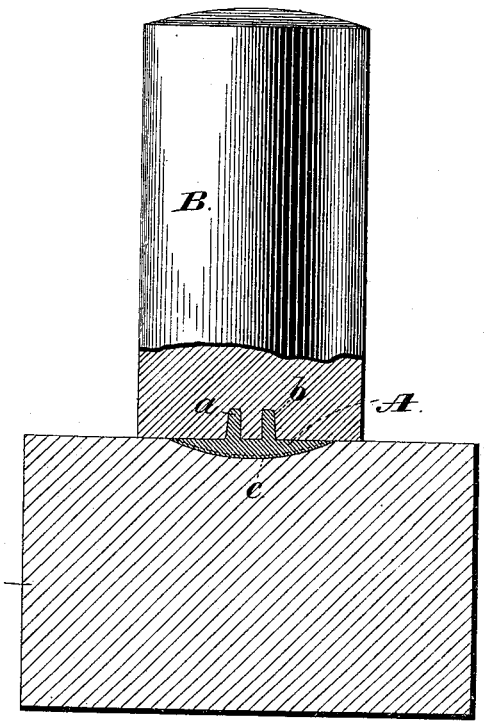
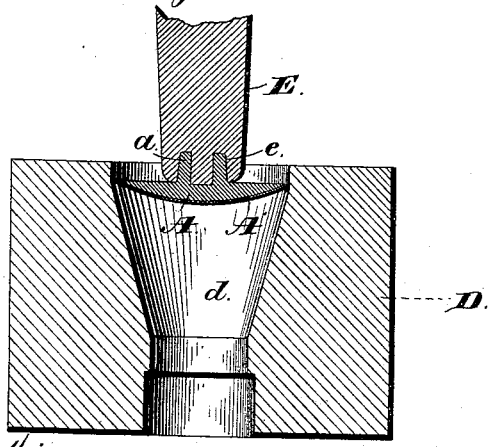
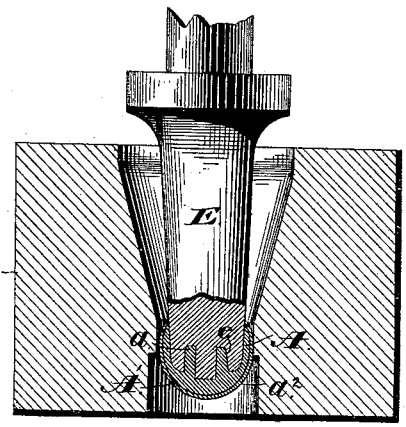
Witnesses:
Jas. E. Hutchinson.
Henry C. Hazard.
Inventor.
W. H. Fitz Gerald, by
Prindle & Russell, his Attys.

(No Model.) 3 Sheets—Sheet 3.
W. H. FITZ GERALD.
MANUFACTURE OF CROWNS FOR WATCH CASES.
No. 353,931. Patented Dec. 7, 1886.

Witnesses:
Jas. E. Hutchinson.
Henry C. Hazard.

Inventor.
W. H. Fitz Gerald, by
Crindler & Russell his attys.

UNITED STATES PATENT OFFICE.

WALTER H. FITZ GERALD, OF BROOKLYN, NEW YORK.

MANUFACTURE OF CROWNS FOR WATCH-CASES.

SPECIFICATION forming part of Letters Patent No. 353,931, dated December 7, 1886.

Application filed May 20, 1886. Serial No. 202,757. (No model.)

*To all whom it may concern:*

Be it known that I, WALTER H. FITZ GERALD, of Brooklyn, in the county of Kings, and in the State of New York, have invented certain new and useful Improvements in the Manufacture of Crowns for Watch-Cases; and I do hereby declare that the following is a full, clear, and exact description thereof, reference being had to the accompanying drawings, in which—

Figure 1:
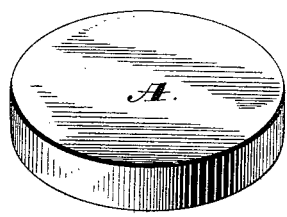
Figure 4:
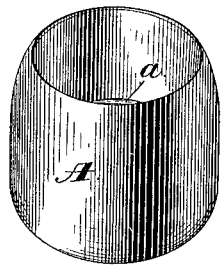
Figure 2:
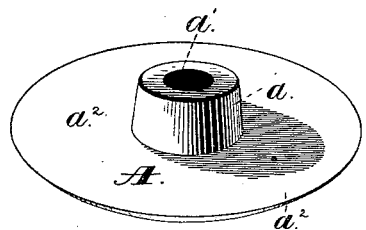
Figure 5:
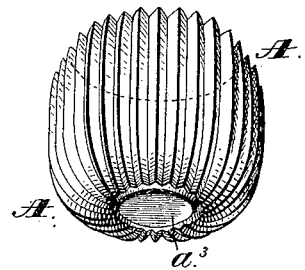
Figure 3:
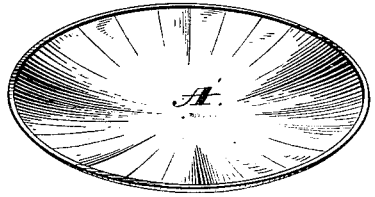
Figure 6:
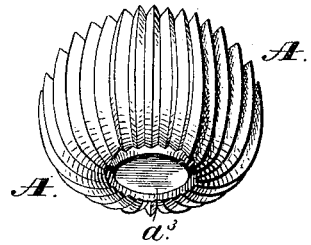
Figure 11:
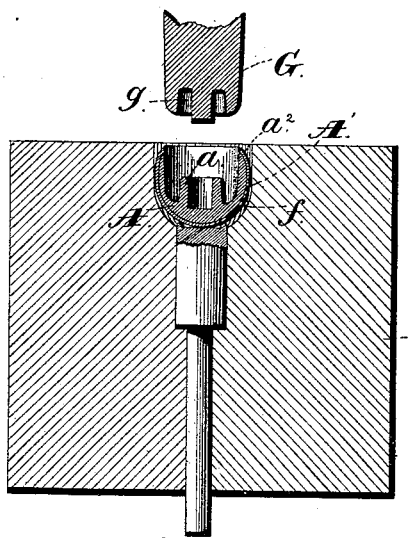
Figure 12:
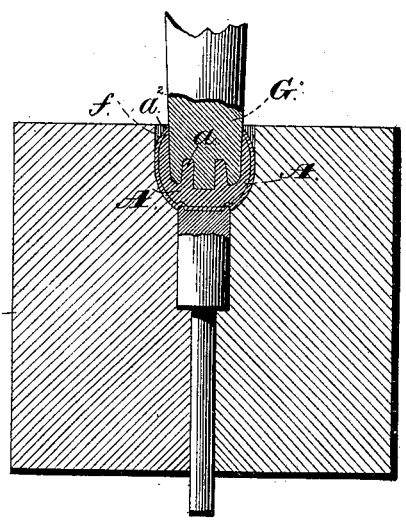
Figure 13:
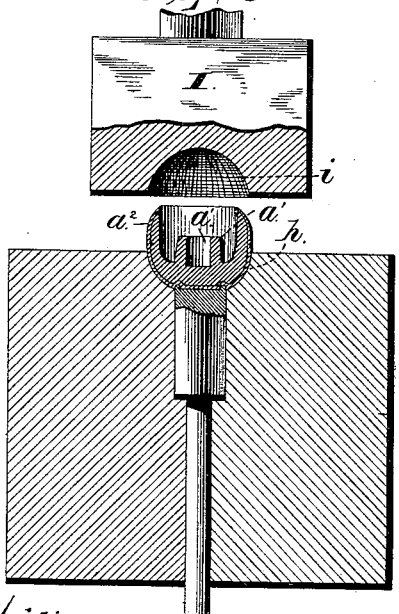
Figure 14:
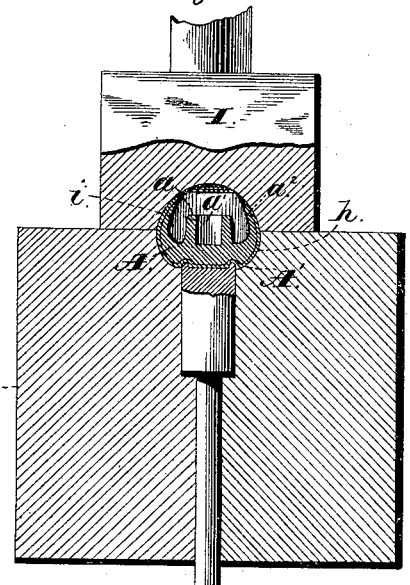

Figure 1 is a perspective view of the blank used for making a crown. Fig. 2 is a like view of the same after having been operated upon by the first pair of dies. Fig. 3 is a perspective view of the fine-metal covering for the exposed portions of said crown. Fig. 4 is a like view of said blank after having passed through the drawing-dies. Fig. 5 is a perspective view of the same after having been operated upon by the ribbing-dies. Fig. 6 is a like view of said blank after having been operated upon by the cupping-dies. Fig. 7 is a vertical central section of the dies first used, the blank being in position for their operation. Fig. 8 is a like view of the same with said dies closed together. Figs. 9 and 10 are vertical central sections of the drawing-dies, and show, respectively, said dies at the commencement and at the close of their operation. Figs. 11 and 12 are like views of the ribbing-dies, and Figs. 13 and 14 are similar views of the cupping-dies.

Letters of like name and kind refer to like parts in each of the figures.

My invention has for its object the construction of a watch-crown from a plain metal disk; and it consists, principally, in the methods employed, substantially as and for the purpose hereinafter specified.

It consists, further, in the dies employed, substantially as and for the purpose hereinafter shown.

In the carrying of my invention into practice the first step is to cut or punch from a sheet of metal a round blank, A, which has a diameter of about one-half of an inch and a thickness of about one-sixteenth of an inch. Said blank is operated upon by a pair of dies, B and C, the latter of which is provided within its upper face with a shallow circular recess, $c$, that has a diameter of about five-eighths of an inch and is slightly concave, as shown, while said die B has within its lower face an annular recess, $b$, which has an outside diameter of about three-sixteenths of an inch and an inside diameter of about three thirty-seconds of an inch, and is about three thirty-seconds of an inch deep. The blank A is now placed within the recess $c$ of the die C, and the die B caused to impinge upon its upper side, by which means its outer portion is compressed vertically and spread horizontally until it fills the recesses $b$ and $c$, as seen in Fig. 8, and has the form shown in Fig. 2, its lower side being rounded and its upper side flat, and provided with a round central boss, $a$, that has a round axial recess, $a'$, which extends to or below the line of said upper face.

If the crown is for use with a filled watch-case, the lower face of the blank A may be plated before said blank is cut from the sheet; or, if desired, a disk of fine metal, A', (seen in Fig. 3,) corresponding in size or shape to the enlarged edge $a^2$ of said blank, is prepared, and either soldered upon the same or secured in position thereon by the operation of other dies, as hereinafter described.

The blank A is now ready for the next operation, which consists in giving to it the form shown in Fig. 4. For this operation I employ a die, D, which at its center is provided with a round opening, $d$, that at its upper end is slightly larger than the diameter of the expanded edge $a^2$ of the blank A, and from thence downward nearly to its lower end decreases regularly in size until it reaches the desired diameter of said part $a^2$ when cupped. With said die is used a second die or plunger, E, which has within its lower end an opening, $e$, that is adapted to receive and contain the cylindrical boss $a$ with its central recess, $a'$, of said blank. The plunger being thus placed over the latter and the expanded edge $a^2$ in position within the upper end of the opening $e$, as seen in Fig. 9, said plunger is caused to descend and force said blank through said opening, with the result shown in Figs. 10 and 4. The next step is the formation of ribs upon the exterior of the part $a^2$ of the blank A, which result is secured by means of two dies, F and G, the first of which is provided with a recess, $f$, that nearly corresponds in size and shape to the like features of said part $a^2$, but has its interior fluted, ribbed, or otherwise figured, while the latter at its lower end corresponds to the interior of said cupped part, and is provided with a recess, $g$, which receives and contains the boss $a$ of said blank. The blank A, after having passed through the drawing-dies, is now placed within the dies F and G, as shown in Fig. 11, and the latter die or plunger caused to descend until, as seen in Fig. 12, the part $a^2$ is caused to closely fill the recess $f$, and its exterior conforms thereto, and has the ornamented surface shown in Fig. 5. The bottom of said recess $f$ has preferably such form as to produce upon the end of the part $a^2$ a plain circular part, $a^3$, which is surrounded and defined by an annular groove; but such may, if desired, be omitted and the ribs caused to extend over said end. The final step consists in giving to the part $a^2$ the form shown in Fig. 6, which is accomplished by the use of two dies, H and I, the lower of which dies, H, is provided with a recess, $h$, that corresponds to and receives the lower semi-spherical half of the part $a^2$, while the upper die, I, has a recess, $i$, which corresponds to the desired shape of the upper portion of said part. At the center said recess $i$ is extended upward sufficiently to enable it to pass over the body without contact therewith. The blank A being placed within said lower die, as seen in Fig. 14, said part $a^2$ is caused to assume the shape shown in Fig. 6. The crown thus formed is completed by threading the axial opening $a'$ to receive the stem-arbor.

Having thus described my invention, what I claim is—

1. As an improvement in the manufacture of watch-crowns, the method of forming a blank, which consists in the placing of a metal disk within or between dies, and by compression with the same producing a radial enlargement which has edges that are thinner than its central portion, and a central recessed boss, substantially as and for the purpose specified.

2. As an improvement in the manufacture of watch-crowns, the method of forming a blank with a cup-shaped head, which consists, first, in compressing a metal disk between dies so as to cause it to be enlarged radially, and such enlargement to have edges that are thinner than its central portion, and a central recessed boss, and next forcing such blank through a drawing-die and causing the outer part of its radially-enlarged portion to be turned upward, substantially as and for the purpose shown.

3. As an improvement in the manufacture of watch-crowns, the method employed for forming a blank having a cup-shaped ribbed head, consisting, first, in compressing a metal disk between dies so as to cause it to be enlarged radially, and such enlargement to have edges that are thinner than its central portion, and a central recessed boss, and next forcing such blank through a drawing-die and causing the outer part of its radially-enlarged portion to be turned upward, and, lastly, forcing such cup-shaped part into a grooved or ribbed die, substantially as and for the purpose set forth.

4. As an improvement in the manufacture of watch-crowns, the method employed, consisting, first, in compressing a metal disk between dies so as to cause it to be enlarged radially, and such enlargement to have edges that are thinner than its central portion, and a central recessed boss, next forcing such blank through a drawing-die and causing the outer part of its radially-enlarged portion to be turned upward, next forcing such cup-shaped part into a grooved or ribbed die, and finally drawing inward by dies the edges of the cup-shaped head, so as to give to said head the general form of a sphere, substantially as and for the purpose shown and described.

5. As an improvement in the manufacture of filled watch-crowns, the method employed, consisting, first, in compressing a metal disk between dies to cause it to be enlarged radially, and such enlargement to have edges that are thinner than its central portion, and a central recessed boss, next soldering or placing upon the outer face of such enlargement a plate of fine metal, next forcing the blank through a drawing-die to cause the outer part of its enlarged portion to be turned upward, and finally drawing inward by dies the edges of the cup-shaped parts, so as to give to the same the general form of a sphere, substantially as and for the purpose specified.

6. As an improvement in the manufacture of filled watch-crowns, the method employed, consisting, first, in compressing a metal disk between dies to cause it to be enlarged radially, and such enlargement to have edges that are thinner than its central portion, and a central recessed boss, next soldering or placing upon the outer face of such enlargement a plate of fine metal, next forcing the blank through a drawing-die to cause the outer part of its enlarged portion to be turned upward, next forcing such cup-shaped part into a grooved or ribbed die, and finally drawing inward by dies the edges of said part, so as to give to the same the general form of a sphere, substantially as and for the purpose shown.

7. As an improvement in mechanism for the manufacture of watch-crowns, the die B, provided with the annular recess $b$, in combination with the die C, having within its face the concave recess $c$, substantially as and for the purpose set forth.

8. As an improvement in mechanism for the manufacture of watch-crowns, the die D, provided with the round tapering opening $d$, in combination with the plunger E, having the opening $e$, substantially as and for the purpose shown and described.

9. As an improvement in mechanism for the manufacture of watch-crowns, the die F, provided with the ribbed or fluted recess $f$, in combination with the die G, having the recess $g$, substantially as and for the purpose specified.

10. As an improvement in mechanism for the manufacture of watch-crowns, the die H, provided with the ribbed or fluted recess $h$, in combination with the die I, having the recess $i$, substantially as and for the purpose shown.

11. As an improvement in mechanism for the manufacture of watch-crowns, the series of dies B and C, D and E, F and G, and H and I, combined and adapted to operate successively in pairs in the order named, substantially as and for the purpose set forth.

In testimony that I claim the foregoing I have hereunto set my hand this 22d day of April, A. D. 1886.

WALTER H. FITZ GERALD.

Witnesses:
W. A. PENDLETON,
ROBT. N. CUTLER.